Patented Nov. 26, 1946

2,411,554

UNITED STATES PATENT OFFICE 2,411,554

LIQUID COATING COMPOSITIONS

Michael Riccitiello, Wilkinsburg, Pa., assignor to Westinghouse Electric Corporation, East Pittsburgh, Pa., a corporation of Pennsylvania No Drawing. Application May 20, 1943,
Serial No. 487,819

2 Claims. (Cl. 260—38)

1

This invention relates to liquid coating compositions.

In the manufacture of plastic Army helmet liners, it is found that the molded plastic liner which is formed of fibrous material impregnated with a synthetic resin has a high gloss finish, the fibrous material employed therein being visible. This high gloss gives a high light reflection, rendering the liners unsatisfactory for military purposes. Different attempts have been made to apply a different surface finish to such molded liners, but these attempts have failed to give a dull, lusterless, marproof finish of the type required. For example, paints applied to the surface of the liner to give a non-textured or smooth painted surface were found to have a tendency to be somewhat glossy and to burnish upon rubbing, and when the painted liner was inserted into the steel helmet with which it is adapted to be employed, the painted surface became marred.

Where texturing materials, such as walnut shell flour, sand, cotton linters or the like, are employed in the paint to give a dull lusterless surface to the molded helmet liners, it is found that either the paint cannot be satisfactorily applied to the liner or the resulting surface is not satisfactory.

Each of the texturing materials employed heretofore has one or more disadvantages in that the material dissolves into the paint so that non-uniformity in surface finish is obtained; the material has an abrasive action on the paint-spraying equipment which is employed in the assembly line set-up for making the liners; the texturing material settles to a hard and solid sediment which is difficult to disperse again in the paint; or the texturing material is so granular that when applied to the liner the texturing material protrudes through the paint film and can be rubbed or picked off, thereby marring the surface finish.

An object of this invention is the provision of a liquid coating composition having a texturing material therein which when applied to a surface will give a dull, lusterless and substantially marproof finish.

Another object of this invention is the provision in a liquid coating composition of polymerizable material of a texturing material of the same base material which can be readily dispersed therein.

Other objects of this invention will be better understood from the following description of the liquid coating composition embodying the teachings of this invention.

Since the helmet liners with which the liquid

2 coating composition of this invention is to be employed are of plastic material, such as laminated sheets of fibrous material impregnated with a synthetic resin which are cured under heat and pressure to an infusible state, it is desirable to utilize a polymerizable paint for the surface finish of the liner. The polymerizable paints will effectively bond with the plastic helmet liner. Such polymerizable paints are well known, many such paints formed with a phenolic, urea, melamine or alkyd base being available on the open market. A detailed description of such paints is therefore believed to be unnecessary in describing this invention.

As an example of such a polymerizable paint, reference may be had to a typical paint having 45% of pigment, such as iron oxide, lampblack, asbestine and tinting colors, and 55% of a vehicle composed of 82% modified alkyd resin and 18% coal tar solvents and driers. In this example, the modified alkyd resin is formed of 45% to 50% solids in the proportion of 22% by weight glycerine, 41% by weight phthalate anhydride, and 37% by weight of unsaturated fatty acids.

In practicing this invention, a polymerized material is employed as the texturing material in the liquid coating composition. The polymerized material is preferably a fibrous material, such as cloth or paper, impregnated with a phenolic-formaldehyde or urea-formaldehyde thermosetting synthetic resin and which has been cured under heat and pressure. The process of making such phenolic-formaldehyde or urea-formaldehyde impregnated material is well known to the trade, the polymerized material being sold by the assignee of this invention under the tradename of "Micarta."

The polymerized material may be specially molded for use in the liquid coating composition, or the scrap and mold flashing resulting from molding plate stock or the like of laminated fibrous sheets impregnated with the resin may be utilized. Whether the polymerized material is specially molded or recovered from scrap, it is processed, as by grinding, to a predetermined particle size ranging from particles which will pass through a 70 mesh sieve, but which will be held on a 250 mesh sieve. Particles of the polymerized material having a size larger than 70 mesh cannot be employed satisfactorily, because they are too large for the automatic spray guns employed for assembly-line application of the resulting liquid coating composition.

Preferably, the polymerized material is finely ground and separated into two grades, one grade having a particle size which will pass through a 70 mesh sieve, but will be held on a 100 mesh sieve, and a second grade which will pass through a 100 mesh sieve, but will be held upon a 250 mesh sieve. When these two grades of particles of the polymerized material are mixed in the proportion of 20% to 30% by weight of the first grade with 80% to 70% by weight of the second grade, a mixture results which, when mixed with the polymerizable paint, gives the required surface finish. By varying the percentages of the two grades of particles of polymerized material, different degrees of texturing may be obtained.

When the particles of polymerized material are mixed in the proportions described hereinbefore, they are preferably thoroughly dampened with a solvent, such as toluol or toluol substitutes, naphthas, lacquer thinners, or other suitable solvents for the polymerizable paint with which the texturing material is to be mixed. The polymerized material is then added to the paint, from 4% to 10% by weight of the polymerized material to the weight of the paint being utilized for this purpose, and the mixture is well agitated to effect the dispersion of the polymerized material in the paint. The particles which have been wetted by the solvent are easily and substantially evenly dispersed in the polymerizable paint. In mixing the particles of polymerized material with the paint, care should be exercised that not less than 4% by weight of the particles be used, as the texturing of the resulting composition is poor, whereas the upper limit of 10% must not be exceeded as this will result in too much inert material in the composition, and the finish of the dried film of the paint will be too rough. Further, where more than 10% by weight of the particles is employed, it is found that there are insufficient vehicle resin solids to properly bond the particles.

The liquid coating composition described hereinbefore and containing the polymerized material in predetermined proportions may be stored for a long period of time before use without damage to the paint, it being found that upon standing the particles of polymerized material settles to a soft sludge which can be easily dispersed again in the paint. The liquid coating composition is readily applied to any given surface by means of an automatic spray gun or by brushing, and when applied to a plastic helmet liner, the coating composition can be readily polymerized by subjecting the coated surface to a temperature of between 225° F. and 275° F. for a period of time of about two minutes. When thus polymerized, the liquid coating composition effectively bonds to the glossy surface of the molded helmet liner, the texturing material comprising the particles of polymerized material, giving the proper textured finish of very low light reflectivity to the helmet liner.

Since the texturing material added to the paint in forming the liquid coating composition is of the same base product as the paint, both usually being thermosetting materials, there is a mutual bond between the paint and the texturing material in the final product. Further, since the texturing material is polymerized before being added to the paint, the particles of texturing material are unaffected by the solvents of the paint, that is, the resin base of the polymerized material is not dissolved by the solvents. Since the texturing material comprises a fibrous type of material, it is found that the fibrous particles lay flat in the paint film and will not protrude therethrough nor can they readily be rubbed or picked off. Further, since scrap material can be utilized in forming the texturing material, it is apparent that it is not necessary to utilize critical materials in developing the required surface finish, and that economies in the steps of manufacturing the helmet liners are had.

Although this invention has been described with reference to a particular embodiment thereof, it is, of course, not to be limited thereto except in so far as is necessitated by the scope of the appended claims.

I claim as my invention:

1. A liquid coating composition comprising, in combination, a paint consisting of about 45% pigment and 55% of a vehicle composed of 82% unsaturated fatty acid modified alkyd resin and a solvent therefor, and a texturing material composed of finely divided material consisting of fibrous material combined with thermoset phenol formaldehyde resin, the finely divided material being present as particles in an amount ranging from 4% to 10% by weight of the weight of the paint, the particles of the finely divided material being present in the proportions of 20% to 30% of particles having a mesh size between 70 and 100 mesh and 80% to 70% of particles having a mesh size between 100 and 250 mesh.

2. A liquid coating composition comprising, in combination, a paint consisting of about 45% pigment and 55% of a vehicle composed of unsaturated fatty acid modified alkyd resin and a solvent therefor, and a texturing material composed of finely divided material consisting of fibrous material combined with thermoset phenol-formaldehyde resin, the finely divided material being present as particles in an amount ranging from 4% to 10% by weight of the weight of the paint, the particles of the finely divided material being present in the proportions of 20% to 30% of particles having a mesh size between 70 and 100 mesh and 80% to 70% of particles having a mesh size between 100 and 250 mesh.

MICHAEL RICCITIELLO.